US009032288B2

(12) United States Patent
Karlsson

(10) Patent No.: US 9,032,288 B2
(45) Date of Patent: May 12, 2015

(54) DOCUMENT PRESENTATION IN VIRTUAL WORLDS

(75) Inventor: Jonas Karlsson, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 1379 days.

(21) Appl. No.: 12/558,180

(22) Filed: Sep. 11, 2009

(65) Prior Publication Data

US 2011/0066928 A1  Mar. 17, 2011

(51) Int. Cl.
G06F 17/00 (2006.01)
G06F 3/0481 (2013.01)
G06F 17/30 (2006.01)

(52) U.S. Cl.
CPC ...... G06F 3/04815 (2013.01); G06F 17/30056 (2013.01)

(58) Field of Classification Search
CPC .............................................. G06F 17/30056
USPC ......... 715/200, 201, 202, 243, 246, 251, 275, 715/277
See application file for complete search history.

(56) References Cited

U.S. PATENT DOCUMENTS

| 5,930,801 | A | 7/1999 | Falkenhainer et al. |
| 2003/0058277 | A1* | 3/2003 | Bowman-Amuah .......... 345/765 |
| 2004/0104935 | A1* | 6/2004 | Williamson et al. .......... 345/757 |
| 2005/0228683 | A1* | 10/2005 | Saylor et al. ...................... 705/1 |
| 2006/0146123 | A1* | 7/2006 | Sorokin et al. ............. 348/14.05 |
| 2006/0210045 | A1* | 9/2006 | Valliath et al. ........... 379/202.01 |
| 2007/0076985 | A1* | 4/2007 | Jiang ............................. 382/306 |
| 2008/0177799 | A1* | 7/2008 | Wilson .......................... 707/200 |
| 2008/0201378 | A1* | 8/2008 | Nagahara et al. .......... 707/104.1 |
| 2008/0222295 | A1* | 9/2008 | Robinson et al. ............. 709/227 |
| 2009/0164918 | A1* | 6/2009 | Bates et al. ................... 715/757 |
| 2010/0053322 | A1* | 3/2010 | Marti et al. ................... 348/135 |
| 2010/0060947 | A1* | 3/2010 | Tuganbaev et al. ........... 358/474 |
| 2010/0182340 | A1* | 7/2010 | Bachelder et al. ............. 345/633 |
| 2010/0188587 | A1* | 7/2010 | Ashley et al. ................. 348/744 |

OTHER PUBLICATIONS

L. Gamberini and A. Spagnolli, "On the Relationship Between Presence and Usability: a Situated, Action-Based Approach to Virtual Environments," Being There: Concepts, Effects and Measurement of User Presence in Synthetic Environments, IOS Press, 11 pages, 2003.
G. Wadley and N. Ducheneaut, "Virtual Barn-Raising": A Study of Collaborative Building in Second Life, 21 pages, publication pending.
Eva-Lotta Sallnäs, "Presence in Multimodal Interfaces," Interaction and Presentation Laboratory, NADA, 6 pages.

(Continued)

Primary Examiner — Stephen Hong
Assistant Examiner — Gregory J Vaughn
(74) Attorney, Agent, or Firm — Hoffmann & Baron, LLP

(57) ABSTRACT

Embodiments described herein are directed to an import converter for importing individual pages of a document into a virtual world and an export converter for exporting captured images of scenes in a virtual world to generate a document. The import converter can convert pages of a document into a sequence of individual page images, which can be uploaded into the virtual world. The individual page images are positioned in the virtual world according to a user-specified layout. The export converter generates a document using scene images captured in a virtual world based on user-specified camera positions. Pages of the generated document incorporate the scene images.

17 Claims, 9 Drawing Sheets

(56) References Cited

OTHER PUBLICATIONS

M. Meehan, B. Insko, M. Whitton, and F.P. Brooks, Jr., "Physiological Measures of Presence in Stressful Virtual Environments," ACM Transactions on Graphics, pp. 645-652, 21(3), Jul. 2002.

M.M. Montoya, A.P. Massey, B. Samuel and N. Lockwood, "PVP: Measuring Perceived Virtual Presence in Collaborative Virtual Environments," MIS Quarterly, Special Issue on New Ventures in Virtual Worlds, 30 pages, Sep. 15, 2008.

http://www.exitreality.com/about.html, "About ExitReality—The Entire Web in 3D," ExitReality, 2 pages.

Wonderblog Project Wonderland Virtual World Toolkit Blog, "Presentations in Wonderland", http://blogs.sun.com/wonderland/entry/presentations_in_wonderland, 8 pages (Sep. 2009).

\* cited by examiner

DOCUMENT PRESENTATION IN VIRTUAL WORLDS

BACKGROUND

1. Technical Field

The presently disclosed embodiments are directed to importation and/or exportation of documents in a three-dimensional virtual environment.

2. Brief Discussion of Related Art

Documents, as states of knowledge, play a significant role in enterprise collaboration. Three-dimensional (3D) virtual environments are growing in use as collaboration tools. The immersion and presence provided by these types of virtual environments enable richer and more effective interactions between remote participants. Typically document review in virtual worlds is performed synchronously according to a sequence of pages in the document. In this manner, users sequentially view each page of a document at the same time. One common form of document is a standard presentation, such as a PowerPoint® slide presentation formed using PowerPoint® from Microsoft, Inc., with one user displaying presentation slides sequentially to a group of users as a slide show to convey information contained in the document. However, conventional approaches to document review in 3D virtual environments do not typically take advantage of the affordances available in the 3D virtual worlds.

SUMMARY

According to aspects illustrated herein, there is provided a method of presenting documents in a virtual world. The method includes converting pages of a document into a sequence of individual page images, uploading the individual page images into the virtual world, and positioning the individual page images in the virtual world according to a user-specified layout.

According to further aspects illustrated herein, there is provided a method of forming a document from scenes in a virtual world. The method includes capturing scene images in a virtual world based on user-specified camera positions in the virtual world and generating a document using the scene images, wherein pages of the document include the scene images.

According to other aspects illustrated herein, there is provided a system for converting between computer documents and a virtual world. The system includes a computing system having one or more computing devices. The computing system is configured to implement an export converter. The export converter generates a document using scene images captured in a virtual world based on user-specified camera positions in the virtual world. Pages of the generated document incorporate the scene images.

DETAILED DESCRIPTION

Figure 1:
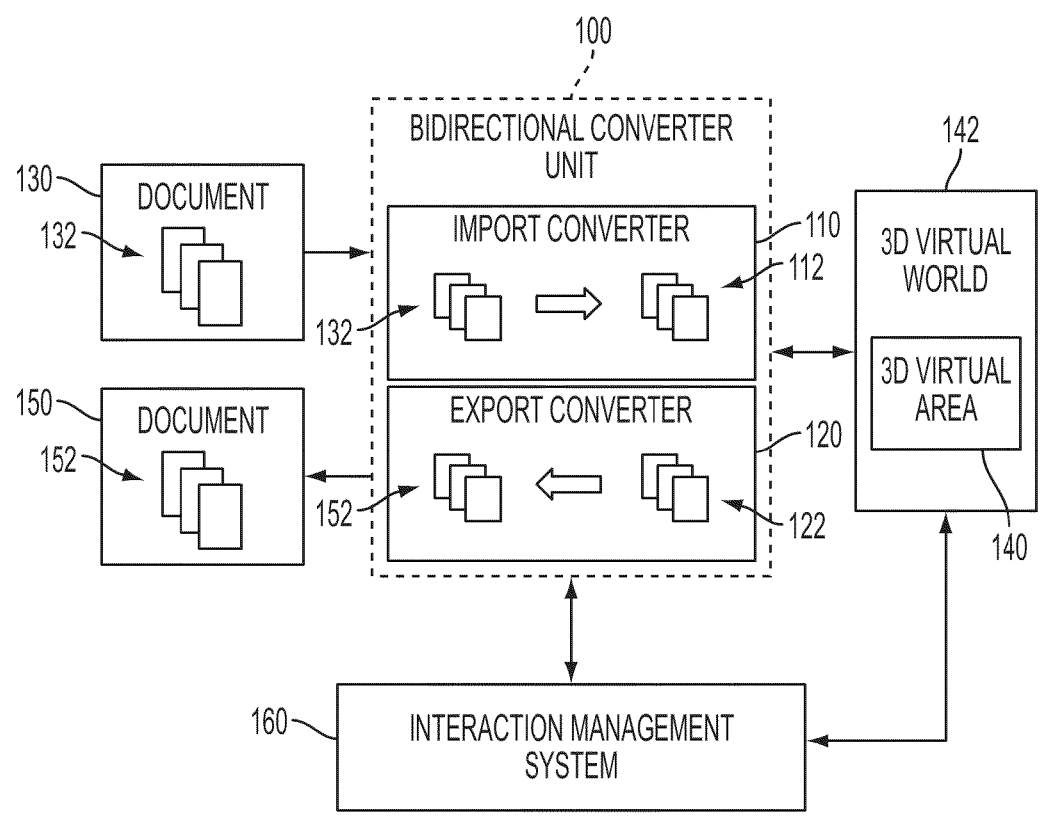
FIG. 1 is a block diagram illustrating an exemplary bidirectional converter.

Exemplary embodiments include an import converter for importing individual pages of a two-dimensional (2D) document into a three-dimensional virtual world and/or an export converter for exporting captured images of scenes in the 3D virtual world as sequential pages to generate a two-dimensional document. Instead of sitting passively during a sequential presentation of the pages, the import converter allows users to wander freely from page to page and to interact with other users that happen to be viewing the same page as the user at the time. The export converter allows a user of the virtual world to share the scene images of the virtual world with people who are not users of the virtual world, by generating a document having a sequence of pages with the images of the captured scenes on them.

As used herein, a "virtual world" refers to a computer simulated environment in which users, represented as avatars, can interact. An "avatar" is a computer animation of the user in a virtual world.

As used herein, a "document" refers to computer file that contains information in a sequence of pages being represented using a two-dimensional view. Some examples of documents include word processing files, portable document files (PDFs), spreadsheet files, slide presentation files, and the like. "Pages" represent a portion of a document that delimited by a boundary typically corresponding to a paper size, such as an 8.5" by 11.5" piece of paper. Pages as used herein encompass presentation slides, where "presentation slides" correspond to a document having a presentation format, such as a PowerPoint® document implemented using PowerPoint® from the Microsoft Corporation.

As used herein, a "bi-directional converter" refers to a converter that includes an import converter and an export converter. An "import converter" refers to a converter for converting pages of a document into pages images and uploading the page images into a virtual world. An "export converter" refers to a converter for downloading captured scene images of a virtual world and generating a document in which pages include the scene images. As used, herein, "converting" refers to transforming an object, such as a page, into another object, such as a page image.

As used herein, a "page image" refers to an image file generated based on pages of a document, where the page images can be in an image format, such as JPEG, GIF, TIFF, BMP, and the like.

As used herein, a "sequence" refers to an order of succession, such as, for example, pages of document ordered according to their page number.

As used herein, "prearranged" refers to being sorted or placed in order beforehand.

As used herein, "uploading" refers to inserting objects, such as page images, into a virtual world by transmitting or sending the objects to the virtual world.

As used herein, "positioning" refers to placing an object, such as a page image, camera tool, and so on, at a location.

As used herein, "surface" refers to a defined area having boundaries and a surface area. In a virtual world a surface, such as a wall, can receive a page image such that the page image is disposed upon the surface.

As used herein, a "track" refers to a defined path or identified course along which page images can be placed and a "layout" refers to a plan or scheme used to determine where to positions objects, such as page images that are to be placed in the virtual world.

As used herein, a "computer file" refers to a data structure in which information is stored and is typically identified by a file name or other metadata. A computer file can have file extension indicating a file format or type of information contained by the computer file, such as for example, a word processing document, a spreadsheet document, a slide presentation document, a image file, 3D model file, and so on.

As used herein, "asynchronous" refers to independent operation where actions can occur without relation to other actions and without a fixed, scheduled, or synchronous succession.

As used herein, "concurrently" refers to occurring substantially simultaneously, such as, for example, a display of multiple images in separate spaces at the same time.

As used herein, "recording" and "capturing" refer to storing information in computer memory. Information captured or recorded can be stored in one or more computer formats.

As used herein, a "scene image" refers to an image captured of an area in a virtual world using a screen-shot tool in a virtual world and can be analogous to a digital photograph taken in the real world. A "camera position" refers to a location and orientation in the virtual world from which the screenshot is rendered by the graphics engine displaying the virtual world.

As used herein, "user-specified" refers to particulars or specifications received from a user, such as, for example, a lay out of page images, a sequence of camera positions, an order in which scene images are to be placed in a document, and so on.

As used herein, "document interactions" refer to interactions in with regard to specific documents (e.g., a document collection, a presentation slide or slides, a report or a page of a report, a web page or web pages, an image or a collection of images, audio or video, 3D model(s), and the like). The document interactions include interactions between avatars and documents, such as collaborative authoring, tagging, searching, and the like, and interactions among avatars within a defined document context, such as conversations, discussions, commentary, dialogue, and the like, around a particular document or group of documents.

FIG. 1 is a block diagram illustrating an exemplary bidirectional converter unit 100 (hereinafter "unit 100"). The unit 100 includes an import converter 110 and an export converter 120. The unit 100 facilitates automatic conversion of pages 132 in a document 130 to a set of page images 112 such that a page image capturing the content of each of the pages 132 is generated. The unit 100 can upload the page images 112 that are generated into a virtual area 140 in a 3D virtual world 142 in accordance with a predefined layout. Likewise, the unit 100 facilitates automatic conversion of scenes in the virtual area 140 of the 3D virtual world 142 into scene images 122 and creation of a document 150 in which one or more of the pages 152 in the document 150 include the captured scene images 122.

The import converter 110 programmatically and automatically uploads pages 132 of a document 130 into a 3D virtual world for display in a predefined layout. The import converter 110 accesses the document 130 that the user wishes to be uploaded into the 3D virtual world 142 by the converter 110. The document 130 can be a word processing document, a slide presentation document, a spreadsheet document, a portable document format (PDF) document, hypertext mark-up language (HTML) document, and the like. The import converter 110 converts each of the pages 132 of the document 130 into a page image having a predefined image format, such as JPG, TIFF, BMP, and the like. In this manner, the content of the pages 132 of the document 130 are captured and stored as individual image files having an ordered association to reflect the sequence of the pages 132 in the document 130.

In some embodiments, page images 112 can be generated using image creation functions that can convert pages 132 to page images 112 or can be generated using other techniques known to those skilled in the art, such as a screen capture. The page images 112 are uploaded, imported, or otherwise inserted into the virtual area 140 of the 3D virtual world 142 by the converter 110 and are positioned according to one or more pre-defined layout specifications, such as one or more predefined tracks, to facilitate asynchronous review of the page images. For example, the page images 112 can be positioned on surfaces that are laid out along the one or more predefined tracks to reflect the sequence of pages 132 in the document 130 represented by the page images 112. Users, represented as avatars, can view the page images 112 by controlling the avatar to follow the one or more predefined tracks in the virtual world 142, or by using an automated transport system that moves the avatar from page image to page image.

Users, represented as avatars can interact with the pages images and with each other in virtual area 140. These interactions, referred to herein as document interactions, can be captured/recorded and associated with the page images using an interaction management system 160. Some embodiments of the interactive management system are described in co-pending U.S. patent application Ser. No. 12/492,709, filed on Jun. 26, 2009 and entitled "Managing Document Interactions in Collaborative Document Environments of Virtual Worlds", the disclosure of which is incorporated herein by reference in its entirety.

The export converter 120 teleports captured scene images 122 from the 3D virtual world 142 to a document 150 so that the information contained in the captured scene images 122 can be reviewed by people outside of the virtual world 142. The document 150 can be generated using a document format, such as word processing format, a slide presentation format provided, for example, using PowerPoint®, a spreadsheet format, a hypertext markup language (HTML) format, and the like. In response to a user-specified sequence of camera positions, the export converter 120 captures scene images 122 for each camera position in the user-specified sequence. The user specified sequence can define an order in which the scene images 122 are to be arranged as pages 152 in the document 150. For example, each of the pages 152 of the document 150 can include one of the scene images 122, where the first page can include a first scene image that was captured according to the user-specified sequence. The scene images 122 are composed, in order, in the document 150 so that users can view the scene images 122 in a sequence defined by the user. The document 150 can be stored and can be subsequently retrieved by users for subsequent use.

Document interactions can be associated with documents captured by the scene images. The document interactions corresponding to the documents can be associated with the scene images such that the scene images can be enhanced by the document interactions. The document interactions can be inserted into the document 150 along with the scene images 122. Likewise, additional information, such as a description of the scene images, can be incorporated into the document 150 to provide context to the scene images.

The 3D virtual world 142 includes the virtual area 140 and is a computer simulated environment in which users, represented as avatars, can interact. Users of the 3D virtual world can experience a telepresence, which allows the user to feel as if they are actual present in the 3D virtual world 142 and/or that they have a physical effect at a location other than their true physical location. Avatars representing users can facilitate a broad range of communications such as text, graphics, visual gestures, social cues, sounds, animations, and the like. Virtual areas in the 3D virtual world 142 can appear similar to the real world and/or can depict fantasy worlds. Rules can be applied in the 3D virtual world 142 to model real world attributes, such as gravity, topography, locomotion, real-time actions, and communication. Some examples of 3D virtual worlds can include Second Life from Linden Research, Inc. (Linden Labs®), Project Wonderland from Sun Microsystems, Inc., Qwaq Forums from Qwaq, Inc, and the like.

Figure 2:
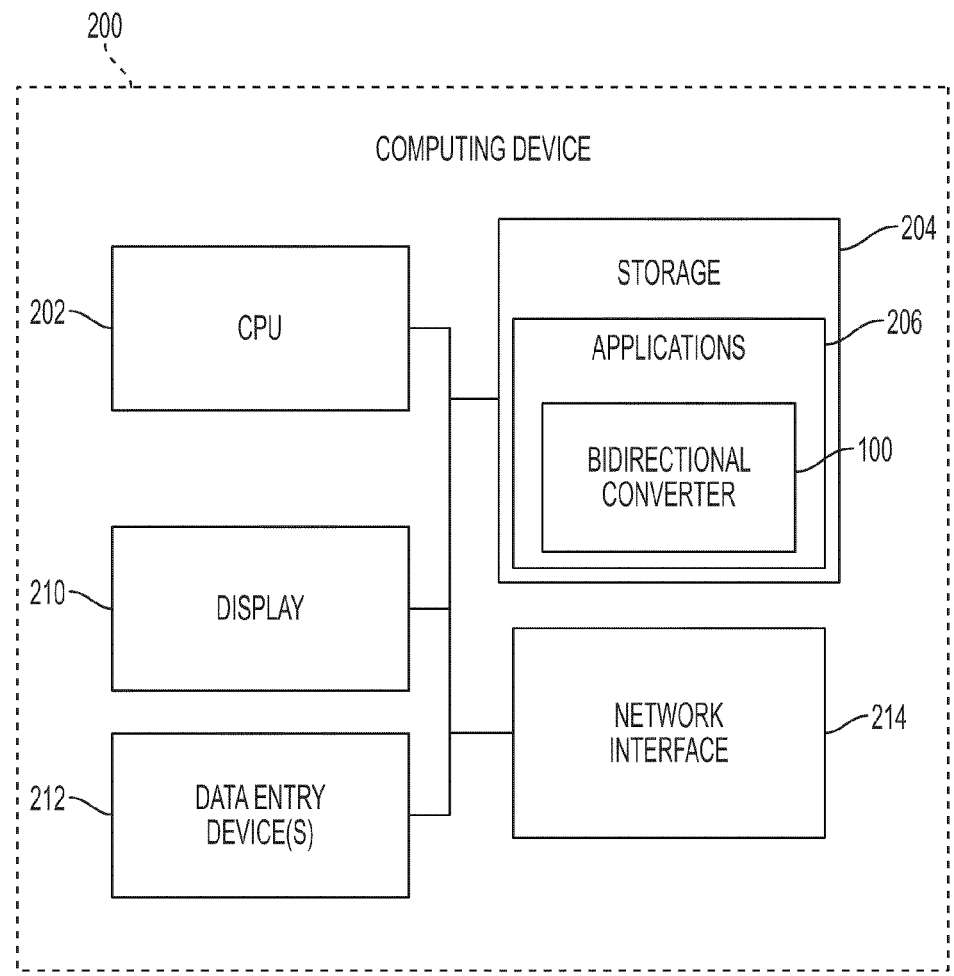
FIG. 2 is a block diagram of an exemplary computing device configured to implement embodiments of a converter.

FIG. 2 is a block diagram of an exemplary computing device 200 configured to implement embodiments of the converter 100. The computing device 200 can be a mainframe, personal computer (PC), laptop computer, workstation, handheld device, such as a portable digital assistant (PDA), and the like. In the illustrated embodiment, the computing device 200 includes a central processing unit (CPU) 202 and can include storage 204. The computing device 200 can further include a display device 210 and data entry device (s) 212, such as a keyboard, touch screen, and/or mouse. The display device 210 enables the computing device 200 to communicate with a user through a visual display.

The storage 204 stores data and instructions and can be implemented using computer readable medium technologies, such as a floppy drive, hard drive, tape drive, Flash drive, optical drive, read only memory (ROM), random access memory (RAM), and the like. Applications 206, such as the bidirectional converter 100, or portions thereof, can be resident in the storage 204. The applications 206 can include instructions for implementing embodiments of the converter 100. The storage 204 can be local or remote to the computing device 200. The computing device 200 includes a network interface 214 for communicating with a network.

The CPU 202 operates to run the applications 206 in storage 204 by executing instructions therein and storing data resulting from the executed instructions, which may be presented to a user via the display 210 or by other mechanisms known to those skilled in the art, such a print out from a printer.

Figure 3:
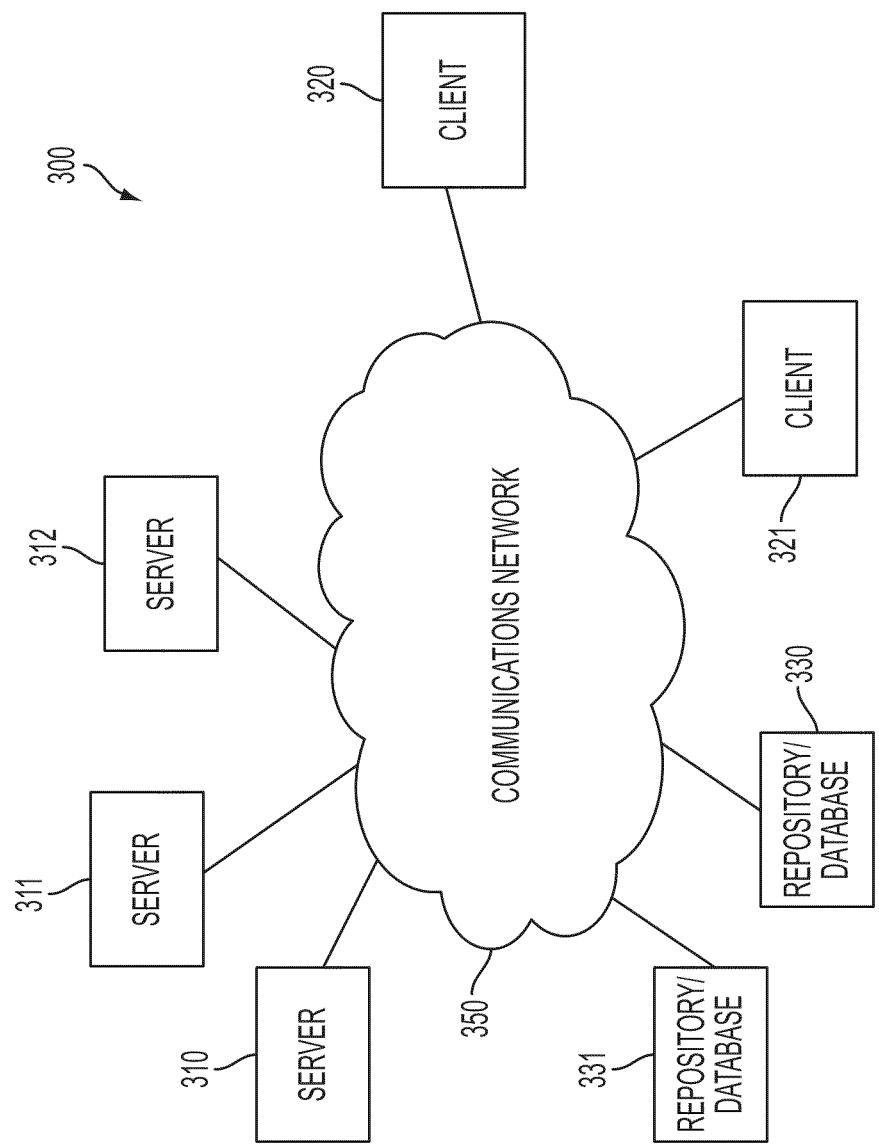
FIG. 3 is a block diagram of an exemplary computing system configured to implement embodiments of a converter.

FIG. 3 is a block diagram of an exemplary computing system 300 configured to implement embodiments of the converter 100. The computing system 300 includes one or more servers 310-312 coupled to clients 320-321, via a communication network 350, which can be any network over which information can be transmitted between devices communicatively coupled to the network. For example, the communication network 350 can be the Internet, Intranet, virtual private network (VPN), wide area network (WAN), local area network (LAN), and the like. The computing system 300 can include repositories or database devices 330-331 (hereinafter "database devices 330-331"), which can be coupled to the servers 310-312, as well as to clients 320-321, via the communications network 350. The servers 310-312, clients 320-321, and database devices 330-331 can be implemented using computing devices.

The servers 310-312, clients 320-321, and/or repository devices 330-331 can store information, such as documents, page images, scene images, sequence information for pages in documents, 3D virtual areas, 3D virtual worlds, and the like. In some embodiments, the bidirectional converter 100 can be distributed among the servers 310-312, clients 320-321, and/or database devices 330-331 such that one or more components of the bidirectional converter 100, or portions thereof, can be implemented by a different device (e.g. clients, servers, databases) in the communication network 350. For example, the import converter 110 can be implemented by the server 310 and/or client 320 and the export converter can be implemented by the server 311 and/or the client 321.

Figure 4:
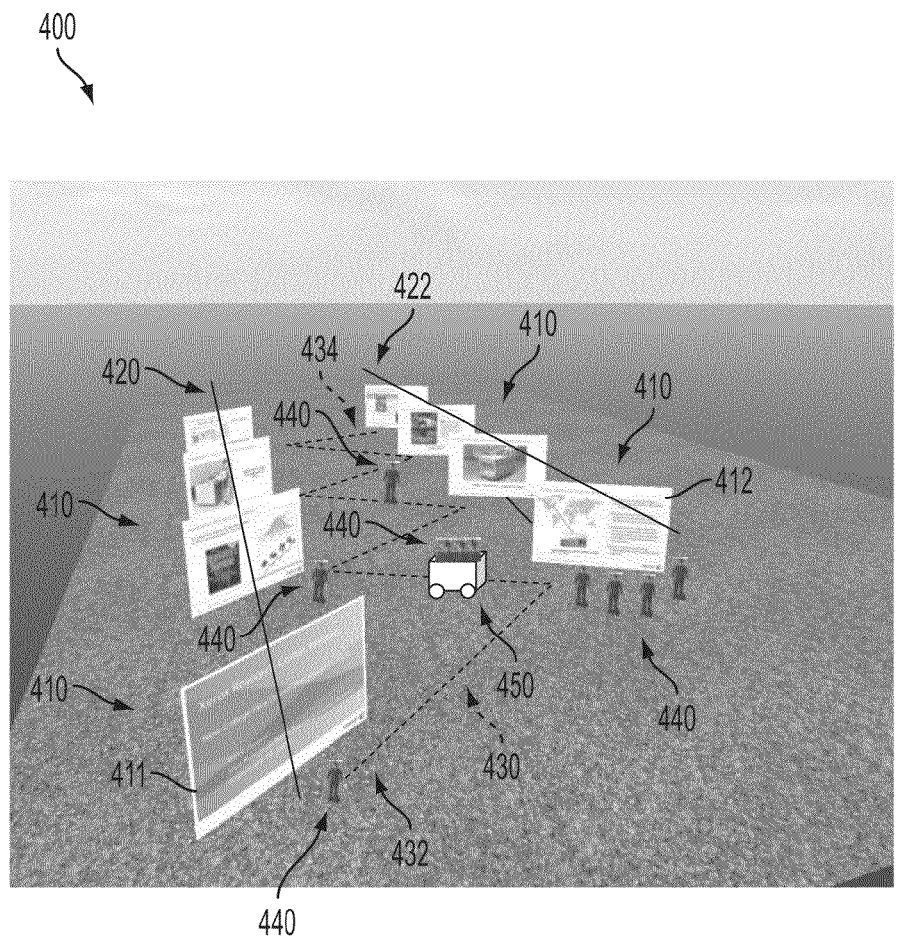
FIG. 4 illustrates an exemplary 3D virtual space in a 3D virtual world that includes page images generated and uploaded using an import converter.

FIG. 4 illustrates an exemplary 3D virtual space 400 in a 3D virtual world that includes page images 410 generated and uploaded using the import converter 110. The page images can be positioned along one or more predefined tracks 420 and 422 in a specified sequence, which can be the original sequence of the pages in the document represented by the page images or can be another sequence. In the present example, page images 410 corresponding to odd page numbers in the document are positioned along track 420 and even page number in the document are positioned along track 422. The page images 410 on track 422 are offset from the page images 410 on the track 420.

A path 430 having a start point 432 and an end point 434 can be displayed in the 3D virtual area 400 to indicate a sequence in which the page images 410 are intended to be viewed. Avatars 440 representing users can be controlled to move from page image to page image following the path 430 and/or can be controlled to move to the page images 410 in any order desired by the users represented as the avatars 440. For example, the user can begin by reviewing a page image 411, which corresponds to a first page of the document, represented using the page images 410, and can move an avatar representing the user to a page image 412, which corresponds to a second page of the document represented by the page images 410. In some embodiments, a virtual transport device 450, which in the present invention is represented a virtual vehicle 452 can carry group of avatars 440 from page image to page image automatically so that the avatars 440 move along the path as a group when reviewing the page images 410.

By converting pages of a document into independent page images, the page images can be automatically laid out in the virtual area so that each page of the document is displayed at an assigned position and so that the page images are displayed concurrently. The import converter can allow the user to specify a lay out from a set of predetermined layouts and/or can allow the user to define their own lay out by specifying positions for the page images in the virtual world. Users can move between the page images independently and can discuss the page images with different groups of users to promote an asynchronous and informal review of the document represented using the page images. Subgroups of users can have discussions centered around one of the page images 410, while other subgroups of users have discussion centered around another one of the page images 410. Laying out the pages of a document captured as page images in the 3D virtual area allows the pages of the document to be integrated with interaction management frameworks, designed to capture user interactions while providing replay and analysis capability, such as for example the interaction management system 160.

Figure 5:
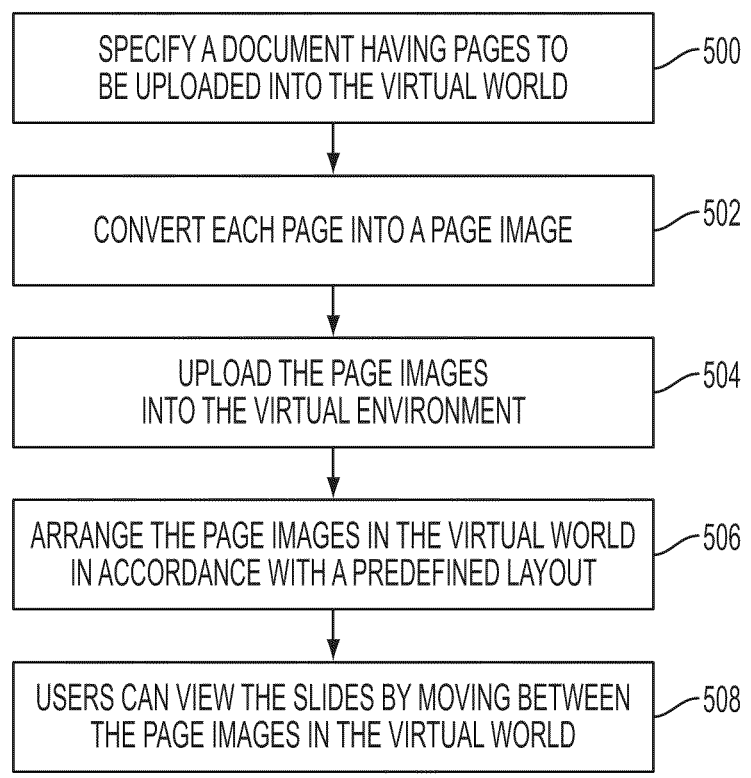
FIG. 5 is a flowchart of an exemplary process of uploading a document into a 3D virtual world.

FIG. 5 is a flowchart of an exemplary process of uploading a document into a 3D virtual world. To begin a user-specifies a document containing the pages that the user wishes to have displayed in the 3D virtual world (500). The import converter 110 converts each page of the document into a page image having an image format, such as JPG, GIF, TIFF, and so on (502). The import converter 110 uploads or transfers the page images to the 3D virtual world (504). The page images are automatically arranged in the 3D virtual world in accordance with a predefined layout, which can be specified by the user that is importing the document (506). For example, the page images can be laid out along one or more pre-defined tracks. Avatars representing users in the 3D virtual world can move between the page images disposed along the one or more predefined tracks to allow the user to view the page images independently or as a group, or the avatars can use an automated transport system that moves user avatar from page image to page image (508).

Figure 6:
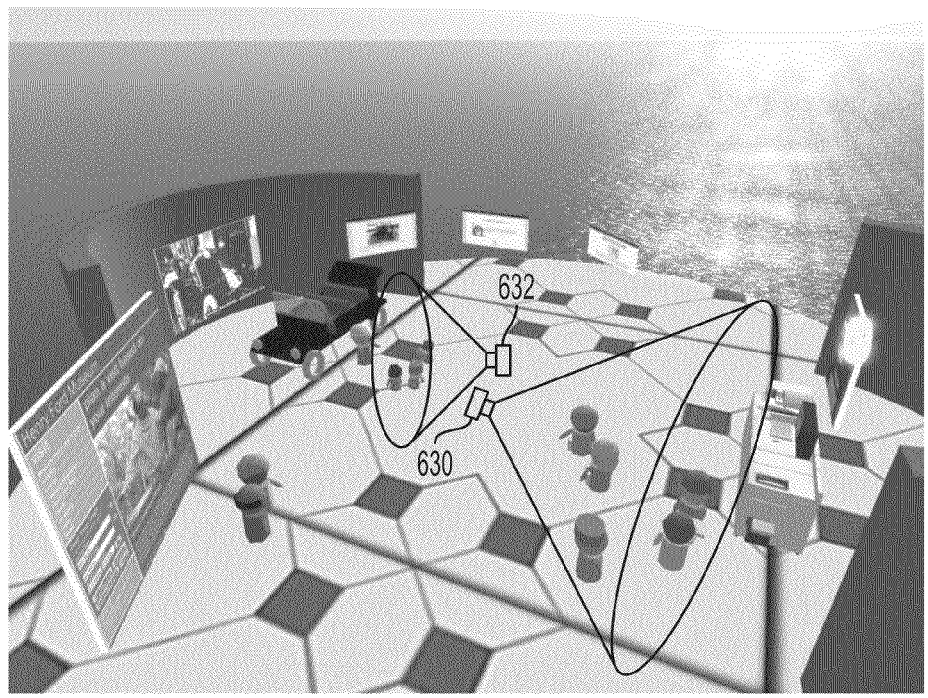
FIG. 6 illustrates an exemplary 3D scene in a 3D virtual world.

FIG. 6 illustrates an exemplary 3D scene 600 in a 3D virtual world. Documents 602 including 3D models 611, images 612, presentation slides 613, HTML documents 614, word processor documents 614, PDF documents 615, and the like, are distributed throughout the scene 600. Avatars 620 can be moved through the scene 600 to allow the user to view the content of the documents. A user who wishes to generate a two dimensional sequentially ordered document to capture the content of the scene 600 can specify a sequence of camera positions from which scene images can be captured to generate various images of the scene 600.

Figure 7:
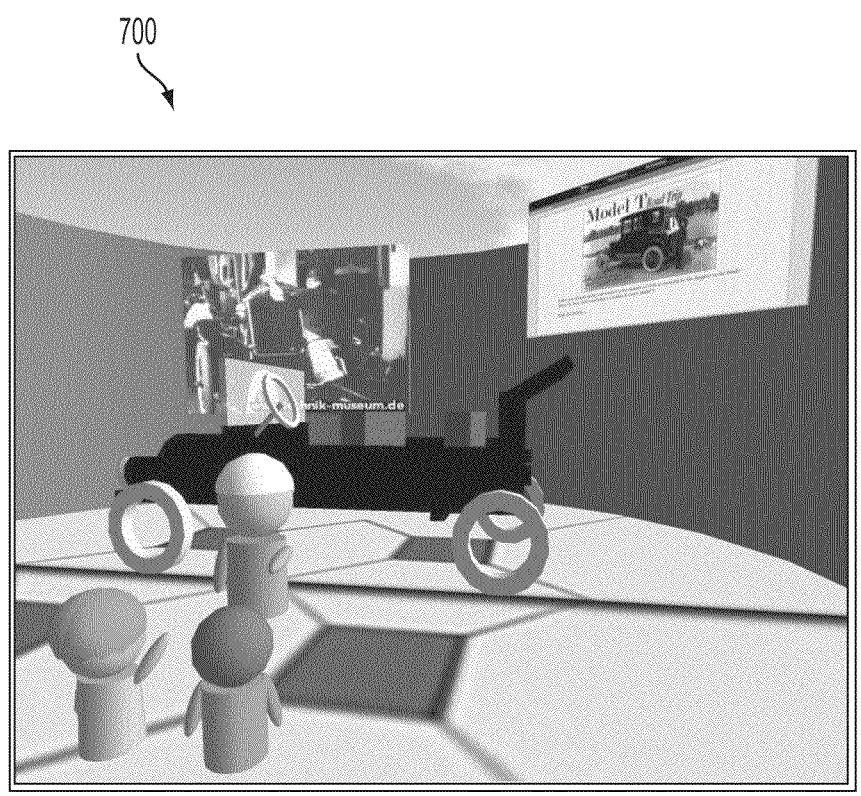
FIGS. 7 and 8 illustrate exemplary scene images captured in the exemplary 3D scene shown in FIG. 6.
Figure 8:
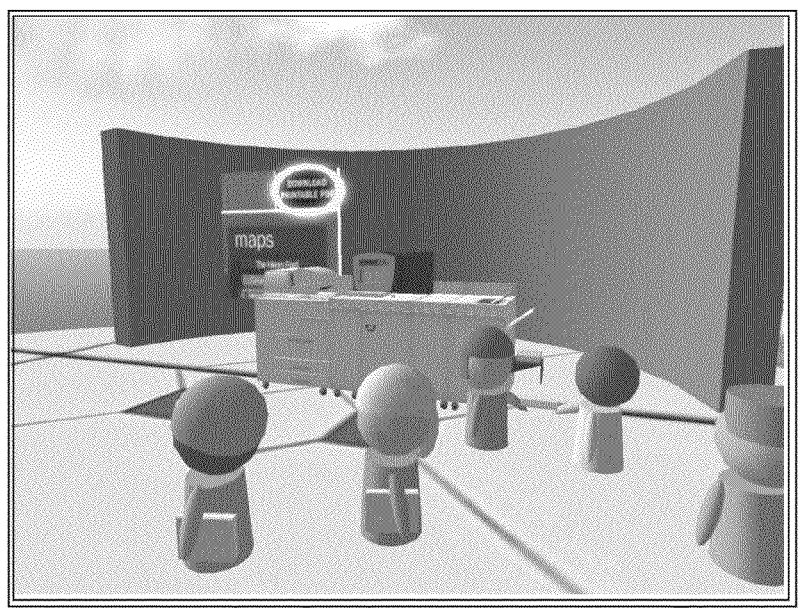

For example, the user can specify a first camera position 630 to capture the some of the avatars 620 interacting with one of the 3D models 611 modeling a document services device, such as a model of a printer, copier, scanner, and/or fax machine, as first scene image 700, as shown in FIG. 7. The user can also specify a second camera position 632 from which a second location including another one of the 3D models 611 in the scene 600 can be capture as a second scene image 800, as shown in FIG. 8.

The user can specify any number of camera positions from which scene images are to be captured. After the user has specified the sequence of camera positions, independent scene images are captured as individual image files in an ordered sequence corresponding to the order in which the camera positions were specified and/or in the order the scene images were captured. The export converter generates a document including the scene images in an ordered sequence of pages. In some embodiments, the ordered sequence of pages can reflect the order in which the camera positions were specified and/or the order in which the scene images were captured. In some embodiments, the ordered sequence of pages can reflect an ordering of scene images that is different than the ordering of the camera positions. For example, the user may desire to reorder the scene images after the images are captured.

Figure 9:
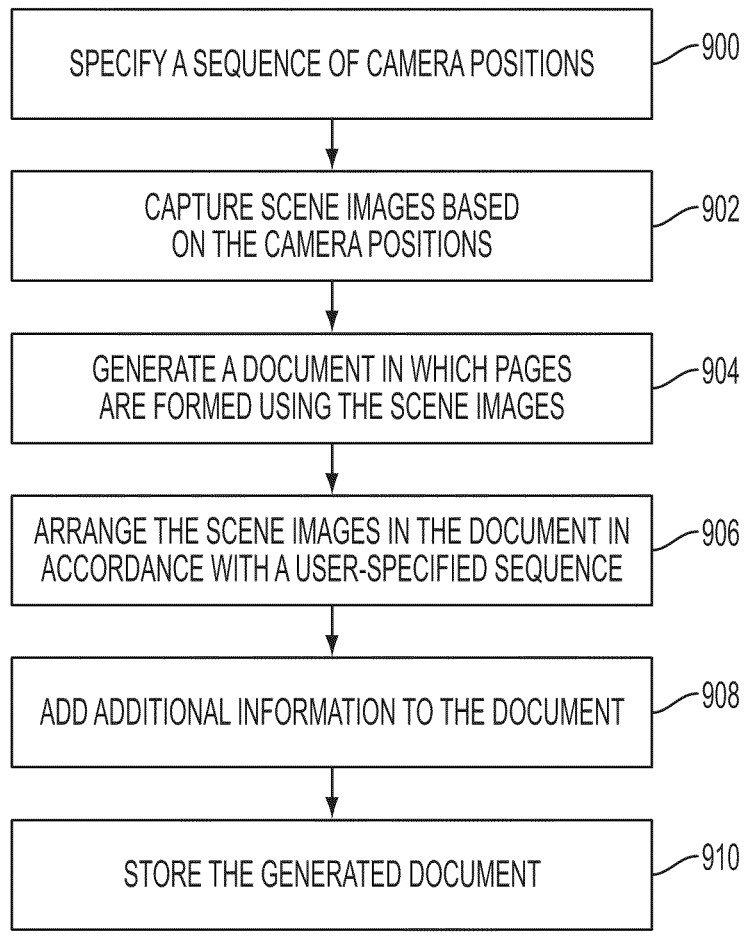
FIG. 9 is a flowchart of an exemplary process for generating a document using scene images captured in a 3D virtual world.

FIG. 9 is a flowchart of an exemplary process for generating a document using scene images captured in a 3D virtual world. To begin, a user can specify an ordered sequence of camera positions in the 3D virtual world from which scene images are to be captured (900). The export converter captures scene images based on the camera positions specified by the user (902). The scene images are used by the export converter 120 to generate a document in which the pages are formed from the scene images (904). The scene images are arranged in a user-specified ordered sequence in the pages of the document (906). For example, the sequence of the scene images can be the user-specified sequence in which the scene images were captured. The export converter can also add addition information to the generated document including, for example, a description of the scene images, or document interactions associated with the scene images (908). The export converter stores the generated document in a remote repository or in a local storage device where the document can be retrieved by the user (910). The export converter can incorporate a description of the scene images into the document as well as any document interactions that have been associated with the captured scene images.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method of presenting documents in a virtual world comprising:
converting pages of a document into a sequence of individual page images;
uploading the individual page images into the virtual world; and
positioning the individual page images in the virtual world according to a user-specified layout, including at least one predefined track, wherein avatars representing users in the virtual world view the individual page images positioned in the virtual world by the avatars being moved along the predefined track within the virtual world between the individual page images.

2. The method of claim 1, wherein the individual page images are uploaded into the virtual world as separate computer files.

3. The method of claim 1, further comprising displaying the individual page images concurrently in the virtual world, and selectively permitting the avatars to asynchronously review the pages of the document using the individual page images.

4. The method of claim 1, wherein the avatars are automatically transported to the individual page images.

5. The method of claim 1, wherein the page images are stored in one of a JPEG, GIF, TIFF, or bitmap image format.

6. A method of forming a document from scenes in a virtual world comprising:
capturing scene images in a virtual world based on a plurality of distinct and user-specified camera positions in the virtual world; and
generating a document using the scene images, wherein pages of the document include the scene images,
wherein capturing scene images comprises capturing scene images in a user-specified ordered sequence.

7. The method of claim 6, wherein generating the document includes incorporating the scene images into the document with additional information.

8. The method of claim 7, wherein the additional information comprises a description of the scene images.

9. The method of claim 6, further comprising inserting the scene images into the pages of the document in accordance with a user-specified sequence.

10. A system for converting between computer documents and a virtual world
a computing system having one or more computing devices, the computing system configured to implement an export converter, the export converter generating a document using scene images captured in a virtual world based on a plurality of distinct and user-specified camera positions in the virtual world, wherein pages of the document include the scene images, and the scene images are captured in a user-specified ordered sequence.

11. The system of claim 10, wherein the computer system is configured to implement an import converter to convert pages of a document into a sequence of individual page images, upload the individual page images into the virtual world, and position the individual page images in the virtual world according to a user-specified layout.

12. The system of claim 11, wherein the import converter positions the page images on prearranged surfaces distributed along at least one predefined track in response to the user-specified layout.

13. The system of claim 11, wherein the individual page images are uploaded into the virtual world by the import converter as separate computer files.

14. The system of claim 11, further comprising displaying the individual page images concurrently in the virtual world to accommodate asynchronous review of the pages of the document using the individual page images.

15. The system of claim 11, wherein system implements the export converter and the import converter as a bidirectional converter.

16. The system of claim 10, wherein the converter incorporates the scene images into the document with additional information.

17. The system of claim 16, wherein the additional information comprises a description of the scene images.

* * * * *